United States Patent
Grichnik et al.

[11] Patent Number: 6,138,109
[45] Date of Patent: Oct. 24, 2000

[54] NEURAL NETWORK DIAGNOSTIC CLASSIFICATION OF COMPLEX BINARY SYSTEMS

[75] Inventors: Anthony J. Grichnik, Peoria; John M. Holm, East Peoria, both of Ill.

[73] Assignee: Caterpillar Inc., Peoria, Ill.

[21] Appl. No.: 08/997,438

[22] Filed: Dec. 23, 1997

[51] Int. Cl.⁷ ................................................. G06F 15/18
[52] U.S. Cl. ................. 706/20; 706/19; 706/903
[58] Field of Search ................ 706/20, 27, 16, 706/903

[56] References Cited

U.S. PATENT DOCUMENTS

| | | | |
|---|---|---|---|
| 4,954,963 | 9/1990 | Penz et al. | 706/25 |
| 5,041,976 | 8/1991 | Marko et al. | 701/29 |
| 5,333,240 | 7/1994 | Matsumoto et al. | 706/20 |
| 5,361,628 | 11/1994 | Marko et al. | 73/116 |
| 5,654,497 | 8/1997 | Hoffheins et al. | 702/27 |
| 5,841,651 | 11/1998 | Fu | 700/48 |

OTHER PUBLICATIONS

"Cascade–correlation neural networks for the classification of cervical cells"; Neural Networks for Image Processing Applications, IEE Colloquium on, 1992, pp. 5/1–5/4.
"Programmable logic controller"; Erickson, K.T.; IEEE Potentials; vol.: 15 1, Feb.–Mar. 1996, pp. 14–17.

*Primary Examiner*—Tariq R. Hafiz
*Assistant Examiner*—George Davis
*Attorney, Agent, or Firm*—Alvin J. Riddles; Steven G. Kibby

[57] ABSTRACT

A malfunction diagnostic and repair guidance system and method wherein a matrix of numbers indicating the state of a complex binary system is used as an input vector for a neural network pattern processing capability that is focused to distinguish malfunction types of patterns. The neural network capability provides two complementary network types to classify and generalize the binary matrix. An interactive operator interface is updated with each repair after the root cause and is proposed repair of a malfunction is identified.

17 Claims, 3 Drawing Sheets

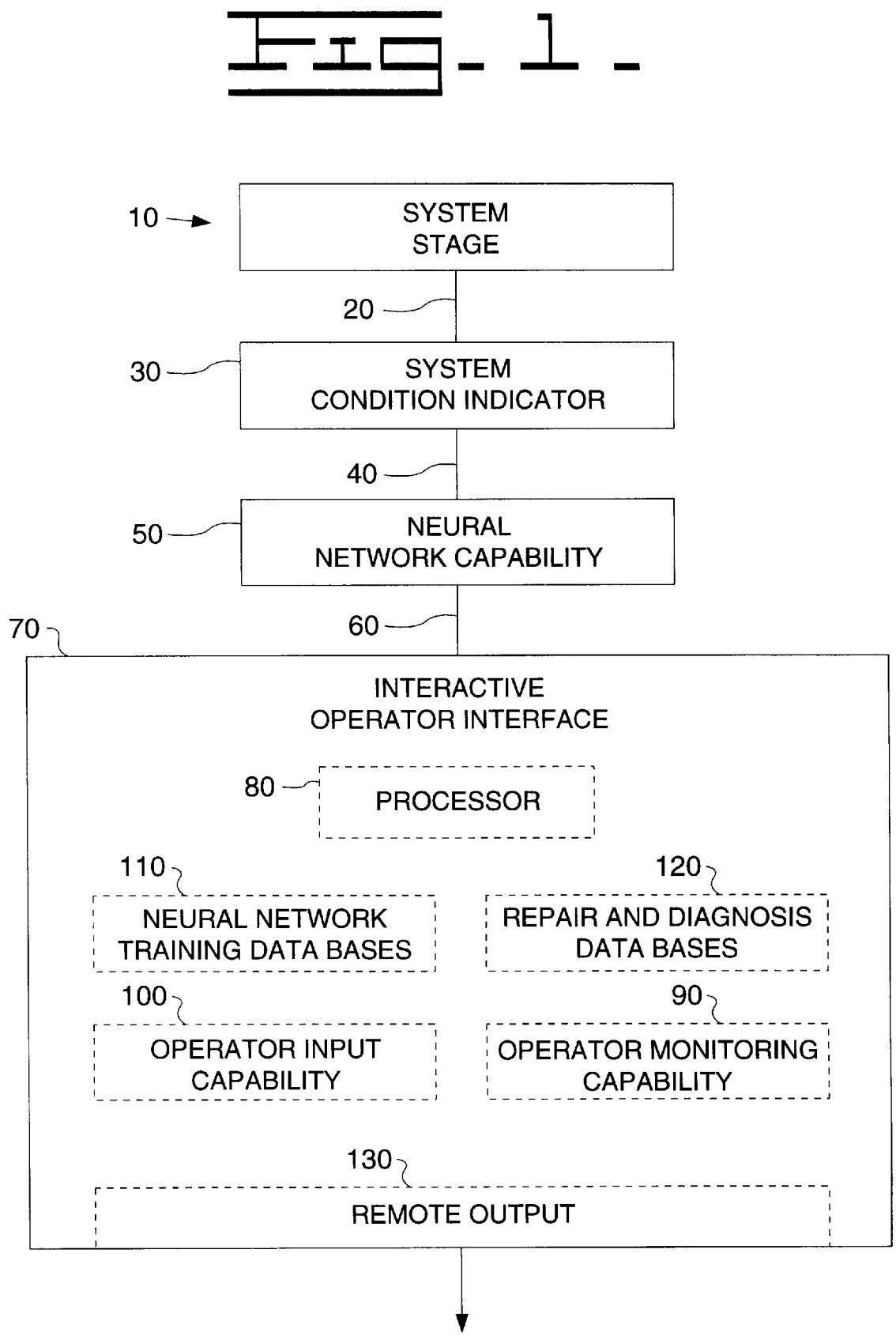

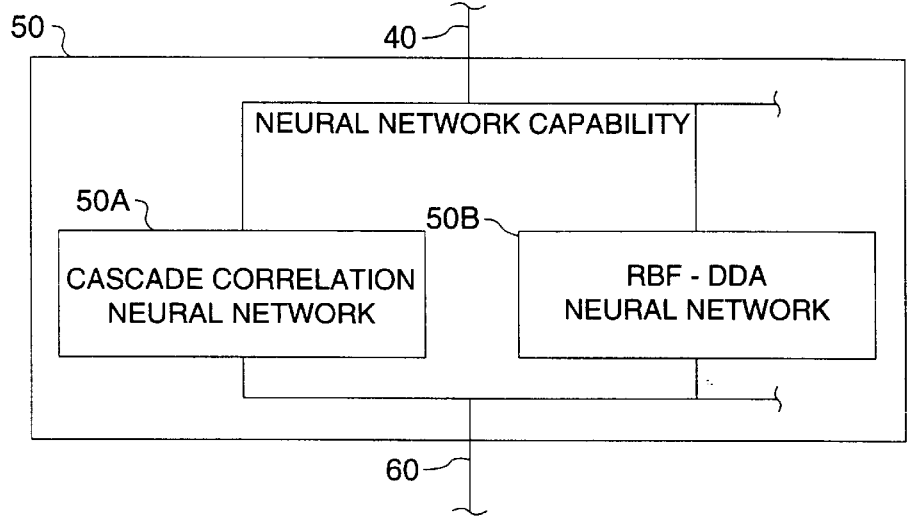
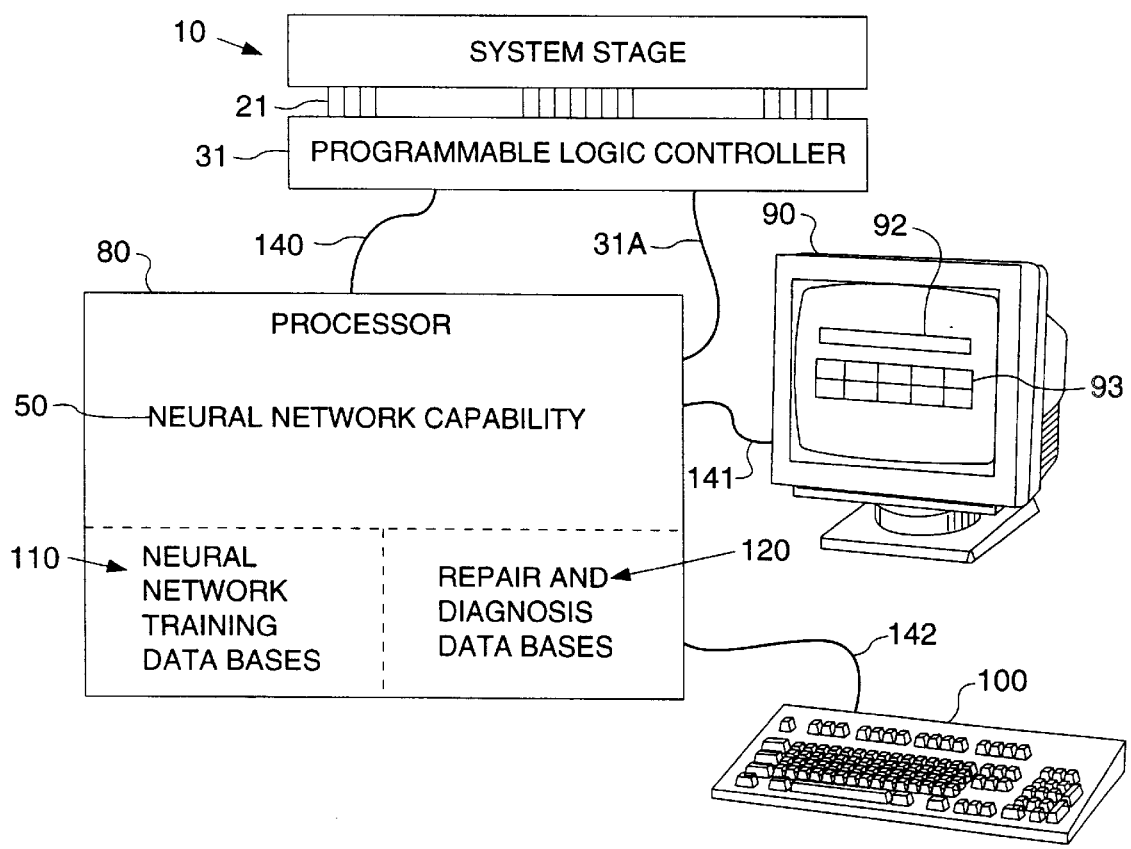

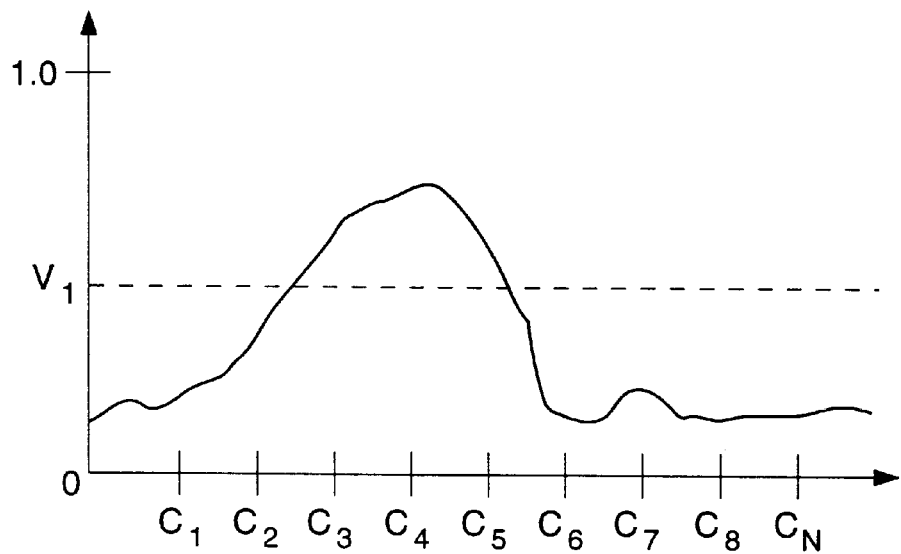
Fig-4a-
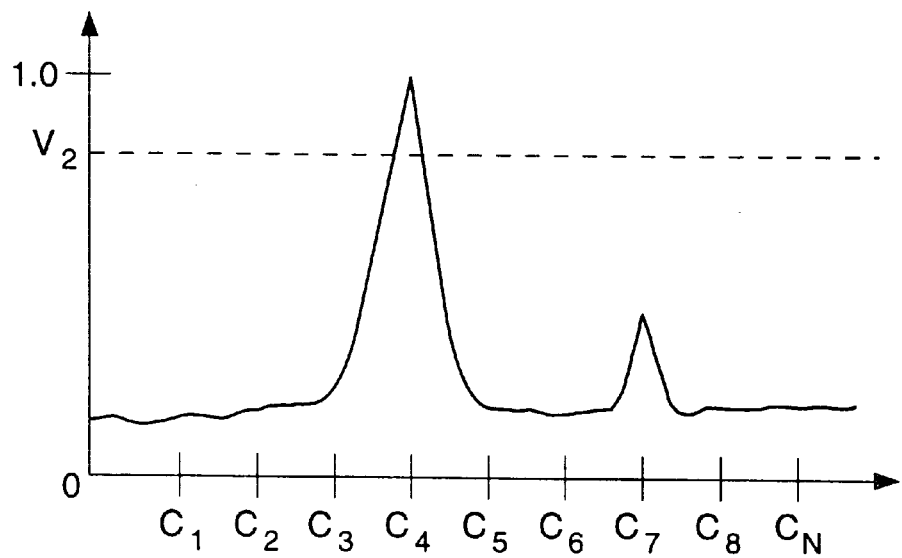
Fig-4b-

NEURAL NETWORK DIAGNOSTIC CLASSIFICATION OF COMPLEX BINARY SYSTEMS

TECHNICAL FIELD

The invention relates to a technique for classifying a complex binary system; and, in particular, to failure identification and repair guidance employing focused neural network processing of a binary matrix representing the state of an electrical logic controller.

BACKGROUND ART

Neural network analysis of analog data, particularly vibration signals, has been used in the art to identify and diagnose problems with rotating machinery. As one example, in U.S. Pat. No. 5,361,628, Marko et al. disclose diagnostic testing and classification of automobile engines using a neural network, wherein subsampling and filtration are applied to a vibration signal band in order to avoid overloading the neural network.

In U.S Pat. No. 5,041,976, Marko et al. disclose a pattern recognition diagnostic system for electronic automotive control systems. System parameters passing between the controller and the engine, both measured and calculated, must be properly selected and formatted as multidimensional input vectors for a neural network, where each parameter value corresponds to one vector dimension. A back propagation neural network is trained by sampling several such multidimensional vectors as each engine diagnostic problem is manually induced. Back propagation is a synthesizing network primarily suited to receiving analog values on each input node and producing a numerical result on a single output node.

Other examples are described in U.S. Pat. No. 5,602,761, titled "Machine Performance Monitoring and Fault Classification Using an Exponentially Weighted Moving Average"; U.S. Pat. No. 5,566,092 titled "Machine Fault Diagnostics System and Method"; and U.S. Pat. No. 5,566,273 titled "Supervised Training of a Neural Network", all assigned to the assignee of the present invention.

When diagnosing a malfunction in a complex binary system, the number of possible malfunctions is typically very large because a failure may be indicated by as little as a single incorrect bit. For example, in a system stage of a complex manufacturing operation directed by an electrical logic controller, the cause of a malfunction may not be readily apparent, nor in some instances even the general location in the overall manufacturing operation where the malfunction took place. A stuck valve, unlatched safety gate, or faulty sensor may be diagnosed by electrical current or continuity testing, or by an incorrect bit value in the controller, if one knows where to look. When it becomes apparent that such an event has occurred, usually as a result of the production of incorrect product, an indication from conventional monitoring within the control system, or a complete breakdown in the manufacturing operation, the operation is interrupted and a highly skilled individual must be employed to identify what is wrong and determine how to fix it.

As the system complexity and the range of malfunction sources expand, typical approaches in trouble shooting are becoming less practical.

SUMMARY OF THE INVENTION

In the invention, a complex binary system is classified through encoding the logic state of at least a stage of the system as a matrix of binary numbers representing an instantaneous view of system condition. The representation is analyzed through the use of a neural network capability focused to recognize a specific previously encountered malfunction pattern and generalize similar previously encountered malfunction patterns. Through an operator interface, the output of the neural network capability is associated with a probable nature and location of the root cause of the malfunction or malfunctions. In cases where a condition is seen for the first time, the neural network capability and diagnosis and repair databases can be updated by the operator through use of an interface input capability to associate a subsequently diagnosed root cause with the unrecognized condition.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a functional diagram of an apparatus and method according to the invention;

FIG. 2 is a depiction of a neural network capability;

FIG. 3 is an illustration of the arrangement of functional elements in an embodiment of the invention involving sensing program logic control (PLC) signals and employing standard input, monitoring and computation apparatus; and FIGS. 4A and 4B illustrate differing response characteristics between two types of neural networks useful in the invention.

BEST MODE FOR CARRYING OUT THE INVENTION

In accordance with the invention, a condition of at least a stage of a complex binary system is represented by a matrix of binary values. The term stage is used herein to any group of related elements under common control, as the present invention is useful to diagnose a virtually arbitrarily selected matrix representing less than all of the complex binary system. In a broad sense, the invention is applicable to the diagnosis of any binary array indicative of a system condition, such as the input, output and status registers of a computer or numerical controller. The invention has the benefits of being able to recognize malfunctions without foreknowledge of all possible malfunctions, by provision of an ability to learn by example and discover general similarities to known diagnoses. As more malfunctions are processed, the system becomes more capable of diagnosing both known and unknown malfunctions, occurring singly or in combination with one another.

Referring first to FIG. 1, there is shown a functional diagram of an apparatus and method according to the present invention. A stage 10 of a binary system under diagnosis is represented in a system condition indicator 30 capable of storing an instantaneous view of the operating conditions of a multiplicity of elements within the system stage 10. The system condition is a body of signals sensed over communications lines 20 from numerous points where there is likely to be influence on what is taking place in the system stage 10 while the stage is in operation.

Preferably, indicator 30 stores the body of signals in a memory buffer and outputs the values stored for one or more recent time periods over a channel 40 upon request. In the alternative, particular specific memory locations in indicator 30 may be polled for their contents in order to derive the binary matrix. In neural network capability 50, each bit of the matrix is supplied to an input node of at least one neural network focused to distinguish binary patterns as described hereinafter. If at least one output node of the neural network produces an output with at least a selected confidence, the network provides output recognizable as class identifiers of input patterns that have been identified in previous experience as being indicative of particular malfunctions and locations. The output is transmitted over channel 60 to an interactive operator interface member 70.

Interactive operator interface member 70 includes a processor 80 for controlling: an operator input capability 100, such as a keyboard; operator monitoring capability 90, such as a video display; remote output 130, such as a printer; and databases 110 and 120. Neural network training databases 110 contain a plurality of input patterns for training neural network capability 50, corresponding to binary matrices sensed during a previously diagnosed malfunction. The network capability is trained as described hereinafter, by adjusting the internal weights to produce an arbitrary output pattern in response to a particular input training pattern. Repair and diagnosis databases 120 contain guidance regarding previously diagnosed malfunctions and recommended repair procedures associated with particular output patterns produced by neural network capability 50 in response to a corresponding training patterns, in order to generate a human readable display to the operator.

The neural network capability 50, in accordance with the invention, is selected to have one or more features that enhance its ability to classify and generalize binary input vectors. There are many types of neural network configurations, each with unique recognition, training and stability characteristics, and most can be assembled in hardware, software, or combinations thereof.

The realization of a suitable neural network capability 50 is preferably focused on providing a neural network configuration having both good generalization and classification characteristics for binary inputs. A back propagation free configuration having an input layer of summing devices, a variable intermediate layer of summing devices, and a single line of output summing devices. Each output summing device (node) represents a single malfunction diagnosis. It should be understood that the foregoing physical architecture is simulated if said neural network capability is embodied in software programs.

In accordance with one aspect of the present invention, the neural network capability 50 includes at least two complementary neural network configurations, a first generalizing network optimized to provide gross pattern recognition and multiple fault recognition, and a second specific classifying network with the ability to detect fine distinctions between similar input vectors. This later network is preferably optimized to have a winner-take-all effect, so that the network will either fail or resonate on only a single node with a high degree of confidence, indicating a specific, unique diagnosis.

Two neural network configurations that complement each other well in this regard are the Cascade Correlation (CC) and the Radial Basis Function with Dynamic Decay Adjustment (RBF-DDA). Both are well known in the art and are described in the following documents, incorporated herein by reference. "The Cascade-Correlation Learning Architecture" by S. E. Fahlman and C. Lebiere, Carnegie Mellon University, 1990, and "Boosting the Performance of RBF Networks with Dynamic Decay Adjustment" by M. R. Berthold and J. Diamond Advances in Neural Information Processing, 7, 1995.

As is generally known in the art, each output node in a classifying neural network is supplied with the sum of the values present on every input node, after each input value has been modified by weighting factors specific to that output node. The pattern classification output by the neural network is represented one or more output nodes having a sum ("confidence factor") greater than a predetermined "vigilance". The network is "trained" by supplying an input vector and adjusting the weighting factors to produce an output on a selected node.

For the purpose of illustrating the present invention, each output node may be considered to correspond to a particular malfunction diagnosis, wherein the weighting factors are adjusted to produce a value on that node greater than the vigilance factor only when an input vector is sensed which is substantially similar to that which occurred when the malfunction was first diagnosed. It should also be noted that the cited neural networks generally do not require orthogonal input-output, meaning that the number of input nodes can be arbitrarily selected to conform to the number of sensed condition parameters and the number of output nodes arbitrarily selected in correspondence to the number of potential diagnoses.

The different neural network configurations are not necessarily provided with similar vigilance factors and slope response characteristics due to their divergent purposes. The RBF-DDA network is better able to recognize general similarities between input vectors and accordingly its output is tested against a lower vigilance factor than that of the CC, often resulting in a number of possible diagnoses with relatively low confidence levels. CC, on the other hand, was chosen for its ability to provide fine differentiation among similar input vectors, such as distinguishing between input vectors having 254 out of 256 identical bits. Accordingly, a relatively high vigilance factor is utilized to limit the diagnoses to those which are recognized with a high degree of confidence.

FIGS. 4A and 4B illustrate the relative slopes and vigilance factors of the RBF-DDA and CC networks, respectively. In FIG. 4A, the sums on the output nodes, C1 to Cn, of the RBF-DDA network increase gradually near a node C4, but at least three nodes C3,C4, and C5 exceed the vigilance factor V1 and represent possible correct diagnoses. In FIG. 4B, the sums on one or two output nodes (each representing a particular diagnosis) of the CC network are significantly higher than all others, and only node C4 exceeds the vigilance factor. Accordingly, the CC provides an all-or-nothing approach, generating a diagnosis only when the input vector is substantially similar to that seen when a previously diagnosed problem with which the network has been trained is encountered. On the other hand, the RBF-DDA may cite a number of previously diagnosed problems which had input vectors only somewhat similar, which may at least indicate regions in the system stage which should be checked manually for malfunctions. If a new malfunction is then diagnosed, the corresponding input vector and diagnosis and repair instructions can be added to the training database for both networks, thereby improving the diagnostic range of the system.

Referring to FIG. 2 there is shown a depiction of the neural network capability 50, wherein a distinguishing neural network configurations CC, labeled element 50A, and a generalizing network configuration RBF-DDA, labeled element 50B, are supplied with identical copies of the matrix in order to produce independent diagnoses. By default the CC diagnosis alone is displayed, with the RBF-DDA results being shown in descending order of output value only when no CC outputs exceed that networks vigilance factor. The display options may of course be modified by the user to show results from both networks for verification or other purposes. In an alternative embodiment, each network may be provided a different variation or piece of the matrix, without departing from the spirit and scope of the invention.

In FIG. 2 the input vector delivered on channel 40 of FIG. 1 is provided to each neural network 50a and 50b, and the outputs of each are delivered on channel 60 of FIG. 1 to a processor 80 of the interactive operator interface 70. The processor 80 is equipped with full data processing capability including, if expedient, sufficient capability to embody the neural network configurations 50a, 50b in software, and is in communication with a monitoring capability 90 such as a display; an operator input capability 100 such as a keyboard; neural network training databases 110 of typical malfunction patterns identified from previous experience, a diagnosis and repair guidance database 120, and a remote output capability 130 such as a printer for delivery of repair instructions to a repairer.

Industrial Applicability

An illustrative complex binary system could be the electrical logic control arrangement at any stage in a manufacturing operation. The principles of the invention are illustrated in FIG. 3, where the instantaneous view of the system involves programmable logic controller (PLC) elements as the source of the binary bits for the input vector, and both the neural network capability and interactive interface are programs in a standard computational apparatus.

In the stage 10 the influential events and conditions are controlled by a program logic controller (PLC), labeled as element 31. The standard computational apparatus preferably includes a general purpose personal microprocessor 80, a monitor 90 and a keyboard 100, and optionally with provision for an output through a printer, not shown; interconnected with cabling 140, 141 and 142.

The processor is equipped with sufficient memory capacity and processing capability to support the neural network capability 50 including the individual storage and processing for networks 50A and 50B, the neural network training databases 110 and diagnosis and repair databases 120 and operations. The microprocessor 80 is preferably equipped with a standard operating system such as Microsoft Windows(™) and is adapted to provide simultaneous window type display 92 and 93 on the monitor 90 screen of an indication of a one or more possible malfunction identifications and where desired, repair instructions.

In the art there are system control devices known as Programmable Logic Controllers (PLC) which selectably provide operational signals for controlling machines and systems. Examples of such PLC devices are the AB PLC 2 provided by the Allen Bradley Co. and the Modicon 984 PLC provided by the Modicon Corporation. The PLC 31 may receive sensed condition signals and responsively produce operational control signals, in a variety of digital or analog forms, under the control of "ladder" programs in a manner well known in the art. The PLC may be instructed to scan the input and output values stored by the PLC for each controlled element in the system 10 to produce thereby the matrix of binary numbers for transfer to the operator interface.

The PLC ladder programs are typically programmed to react to specific bit configurations which may be encountered with certain definitely identified malfunctions, such as for example "no work piece in position", commonly referred to as "traps". A trap may produce an error indication on a terminal 31A of the PLC to alert the operator that a malfunction has occurred, but in and of itself provides little diagnostic help. According to the present invention, diagnosis may be initiated manually by the operator, and may also be automatically initiated by a trap warning indication generated on a line 31A.

Conventionally, trap programs are written to look for a plurality of input or output PLC bit combinations known to represent a particular malfunction, in order to halt the manufacturing operation for repair or display a warning indication. Great effort is required however, to predict all possible malfunctions and design a corresponding trap as the controlled system complexity increases. According to the present invention, malfunctions are diagnosed and added to the database as they occur during normal operation, whereas relatively simple traps may be retained to prevent only potentially damaging or dangerous malfunctions.

The body of signals representing the condition of system stage 10 is communicated over multiple communication lines 21. The body of signals 21 is stored in PLC 31 by a plurality of memory registers together forming a binary matrix representing a condition of the system 10 at a point in time.

In operation, the body of signals 21 is delivered through the cabling 140 to the processor 80 in which all neural network operations and associations with natural language text in repair and diagnosis databases 120 can take place. The processor supplies the matrix as a vector to binary responsive elements in the input of the neural networks, 50A and 50B, in this instance constructed by software programming simulation.

If a previous experience acquired pattern is a close match to the input vector pattern, the stored location and proposed repair is provided to the operator. If no match is sufficiently close to exceed the vigilance factor on at least one output node, indicating the pattern is being seen for the first time, the neural network analysis may be followed by diagnosis interaction to suggest proposed repairs, or by conventional use of schematic diagrams and point-to-point voltage and resistance measurements. When the root cause requiring repair is discovered, the database 120 is updated and the neural networks adjusted to "learn" the new pattern. The technology becomes increasingly effective and accurate with use.

What has been described is a malfunction diagnostic and repair guidance system and method; wherein a matrix of numbers indicating the state of each point in a stage of a system is used as an input vector for a neural network pattern processing capability, that in turn is focused to distinguish malfunction types of patterns, and, through an interactive operator controlled system that is updated with each repair, the root cause and proposed repair of a malfunction is identified and remedied.

What is claimed is:

1. Apparatus for identifying the cause of a malfunction, comprising in combination:

an electronic logic controller producing a binary matrix representing a state of a complex system; and a neural network capability receiving said binary matrix as an input vector, and producing output classifications corresponding to similar vectors used to train the network capability, said capability including a neural network optimized for unique classification and a neural network optimized for generalization.

2. The apparatus of claim 1, wherein said neural network optimized for unique classification produces an output classification identifying a previously diagnosed malfunction only in response to an input vector substantially similar to an input vector used to train the network, and, said network type optimized for generalization is adapted to identify a plurality of previously diagnosed malfunctions corresponding to training vectors most similar to a received input vector.

3. The apparatus of claim 1, further comprising an interactive operator interface producing human readable diagnosis and repair guidance output responsive to at least a highest confidence network output.

4. The apparatus of claim 3, wherein said interactive operator interface comprises a general purpose computer.

5. The apparatus of claim 3, said operator interface further including operator input capability, operator monitoring capability, a data processing capability, and database storage containing neural network training patterns and corresponding malfunction identification and repair diagnostics.

6. The apparatus of claim 1 wherein said neural network capability includes a cascade correlation type neural network.

7. The apparatus of claim 6, wherein said neural network capability further includes a radial basis function with dynamic decay adjustment type neural network.

8. The apparatus of claim 1, wherein said controller comprises a programmable logic controller and said binary matrix comprises at least one of an input register and an output register of said programmable logic controller.

9. The method of identifying and locating a malfunction in a system stage of an electrical logic control system, comprising in combination the steps of:

generating a binary matrix from binary data corresponding to a logic condition of said control system;

providing a neural network capability for classifying said binary matrix in comparison with patterns of previously experienced malfunctions; and associating in an operator interface output patterns of said neural network with diagnostic and repair guidance.

10. The method of claim 9, wherein said step of providing a neural network capability includes providing a first neural network optimized for unique pattern classification and a second neural network optimized for generalization.

11. The method of claim 10, wherein said neural network capability includes a cascade correlation type neural network and a radial basis function with dynamic decay adjustment type neural network.

12. The method of claim 10, wherein said step associating in an operator interface output patterns of said neural network with diagnostic and repair guidance comprises displaying an identification and location of a malfunction corresponding to an output pattern of said neural network capability.

13. The method of claim 10, wherein in said step of providing a diagnosis and repair guidance there is provided a display of a plurality of different diagnosis and repair guidance instructions when the neural network capability is unable to identify a sufficiently close relationship to a previously identified input matrix.

14. The method of claim 9, wherein said neural network capability includes at least one interconnected back propagation free configuration having an input layer of summing devices, a variable intermediate layer of summing devices, and a single line of output summing devices.

15. The method of claim 9, wherein said neural network capability and interactive operator interface are performed in a general purpose computer.

16. An apparatus for generating malfunction identification and repair information regarding a stage of a system operated by an electrical logic controller, the controller having a matrix of binary values representing a condition at a point in time for a plurality of controlled elements in the system stage, the apparatus comprising in combination:

a neural network capability, said neural network capability having a first network type optimized for recognizing in said binary matrix general characteristics of previously identified malfunction patterns, and a second network type optimized to recognize a said binary matrix substantially similar to a single malfunction pattern identified through previous experience;

an interactive operator interface having,
      an operator input capability,
      an operator monitoring capability,
      database storage containing a
         plurality of said previously identified malfunction patterns, correlated with location and repair guidance information; and,
         means for introducing said binary matrix into said neural network capability.

17. The improvement of claim 16, wherein said electrical logic control system includes a programmable logic controller having input/output registers for storing said matrix of binary values representing a condition of the system stage.

* * * * *